United States Patent [19]

Cossitt

[11] 4,182,432

[45] Jan. 8, 1980

[54] SUPPORT APPARATUS

[76] Inventor: Forrest T. Cossitt, 3017 Ruthland Rd., Richmond, Va. 23228

[21] Appl. No.: 918,420

[22] Filed: Jun. 23, 1978

[51] Int. Cl.2 .............................................. F16M 11/00

[52] U.S. Cl. .................................... 182/151; 182/181; 248/165; 297/442

[58] Field of Search ................................ 182/181-186, 182/151, 224, 225, 226; 248/174, 165; 297/442

[56] References Cited

U.S. PATENT DOCUMENTS

| | | | |
|---|---|---|---|
| 3,035,660 | 5/1962 | Leon | 182/181 |
| 3,339,920 | 9/1967 | Moritz | 182/181 |

*Primary Examiner*—Reinaldo P. Machado

[57] ABSTRACT

This invention relates to a knock down support apparatus which does not require any fasteners the principles of which are particularly adaptable to sawhorses, trestles and the like, which is capable of being knocked down or taken apart for transportation or storage in compact form.

2 Claims, 4 Drawing Figures

FIG. 1
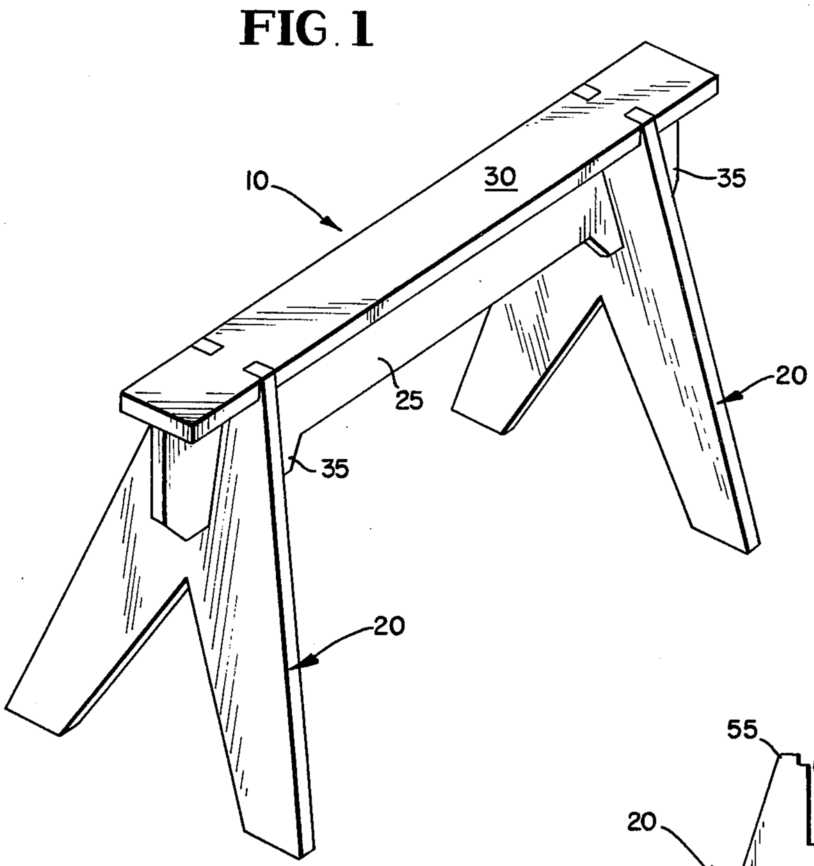
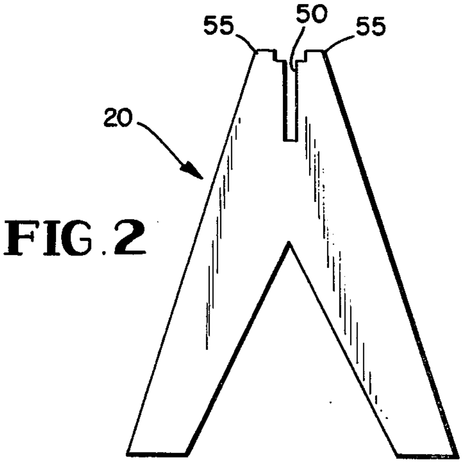
FIG. 2
FIG. 3
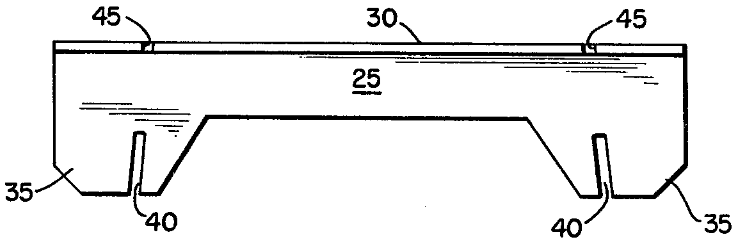
FIG. 4
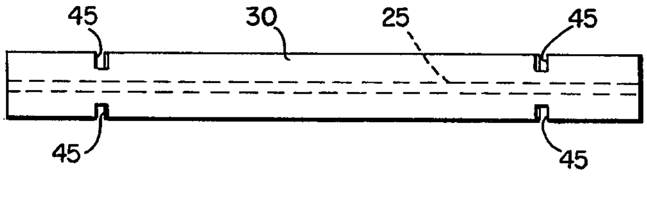

SUPPORT APPARATUS

This invention relates to a support apparatus the principles of which are particularly adaptable to sawhorses, trestles and the like. More specifically, the invention relates to support apparatus of the type which requires substantial strength yet which is relatively lightweight, portable, and easily disassembled for transportation or storage.

The prior art contains other "knock-down" supports such as disclosed in U.S. Pat. Nos. 3,035,660; 2,911,265 and 407,081. While it appears the apparatus contained in these disclosures are operative, the present invention is characterized in providing improvements thereover, as well as novel elements of structure as will be described below.

It is, therefore, the principle object of this invention to provide a novel support apparatus which may be comprised only of a cross beam and two leg members. Other objects are to provide a support apparatus: capable of quick, easy assembly or disassembly through interlocking elements not requiring any mechanical fastening means; which in the disassembled state is conveniently storable in a minimum of space; and which is comprised of interlocking members affording solid support in all directions with a minimum number of parts.

Other objects will become apparent to those skilled in the art from the following description made in connection with the accompanying drawing wherein:

FIG. 1 is a perspective view of the preferred embodiment of the invention;

FIG. 2 is an elevation view of one of the legs of the apparatus shown in FIG. 1;

FIG. 3 is a side elevation view of the cross beam member of the apparatus shown in FIG. 1; and FIG. 4 is a top plan view of the cross beam member.

Referring to the drawing, the apparatus is comprised of three elements, a cross beam 10 and two similar legs 20. The cross beam is T-shaped in cross section as shown having a substantially vertical I-section 25 and a horizontally disposed platform member 30. At opposite ends I-section 25 is provided with areas of increased depth as shown in FIG. 3 at 35 in which slots 40 extend upwardly from the bottom thereof to a point short of the platform member 30. The latter is notched at 45 as shown in FIGS. 3 and 4.

As shown in FIG. 1, legs 20 are adapted to interlock with beam 10 by fitting into slots 40 and knotches 45, the legs being correspondingly shaped by the T-shape cut 50 shown in detail in FIG. 2. In particular the relatively long vertical section of T-shaped cut 50 corresponds to the length of slot 40, i.e., approximately half the depth of the beam or about 4–7 inches for sawhorses of the most conventional sizes. This relationship affords a large contact area between beam and legs in both lateral and longitudinal directions whereby the apparatus is contained against swaying in each direction. Moreover, the legs are firmly locked into position and require no spacer bar or other means to prevent the legs from spreading apart. The interlock created between the legs and platform 30 by projections 55 formed at the top of the legs, enhances the solid support of the apparatus and utilizes platform 30 in the direction of its greatest strength in holding the legs in place during use. In fact, both portions of the T-cross beam resist movement of the legs in both the longitudinal and lateral directions. As seen in the drawing, leg projections 55 extend upwardly through platform member 30 and preferably are cut to a length such that they will form a flat surface along with the surface of platform 30.

The support is further stabilized by the load bearing relationship of the beam and legs. In some cases a portion of the load will be borne directly by the compressive strength of the legs, while substantial portion of any load bearing on beam 10 will be transferred to the legs within T-shaped cut 50 thereby creating less turning moment in the sideways or lateral direction than would occur from an eccentric load transferred totally to the legs at the upper most surface thereof.

In describing the invention, reference has been made to the preferred embodiment, the best mode as required by the statute. Those skilled in the art, however, and familiar with the disclosure of the subject invention may recognize additions, deletions, modifications, substitutions and/or other changes which will fall within the purview of the subject invention.

What is claimed is:

1. A knock-down support apparatus comprised of interlocking legs and a T-section cross-beam, said legs having T-shaped cuts extending downwardly from the middle of and partially across the top thereof whereby upwardly extending leg projections are formed on opposite sides of said T-shaped cuts in the upper portion of said legs, and said T-section cross beam is correspondingly cut with slots extending upwardly from the bottom of the vertical section and opposing notches on the sides of the horizontal section to interlockingly fit said upwardly extending projections in the horizontal section and overlappingly fit together along the vertically slotted portions of said legs.

2. Apparatus as defined in claim 1 wherein the top surfaces of the uncut portion of said legs and the horizontal section of said T-section cross beam form together a load bearing surface.

* * * * *